(12) United States Patent
Henry

(10) Patent No.: US 8,202,096 B2
(45) Date of Patent: Jun. 19, 2012

(54) BIG CANYON BALLOON

(75) Inventor: Laurie Boone Henry, McKinney, TX (US)

(73) Assignee: Trinity Science Solutions LLC, Gunter, TX (US)

( * ) Notice: Subject to any disclaimer, the term of this patent is extended or adjusted under 35 U.S.C. 154(b) by 521 days.

(21) Appl. No.: 12/489,993

(22) Filed: Jun. 23, 2009

(65) Prior Publication Data

US 2009/0317782 A1    Dec. 24, 2009

Related U.S. Application Data

(60) Provisional application No. 61/074,970, filed on Jun. 23, 2008.

(51) Int. Cl.
*G09B 23/40* (2006.01)
(52) U.S. Cl. ....................................................... 434/299
(58) Field of Classification Search .................... 434/72, 434/130, 299, 433; 446/220, 221, 225, 476, 446/477; 52/2.11, 2.17, 2.18, 2.21
See application file for complete search history.

(56) References Cited

U.S. PATENT DOCUMENTS

| | | | | |
|---|---|---|---|---|
| 4,164,829 A * | 8/1979 | Sadler | ................. | 52/2.14 |
| 4,332,112 A * | 6/1982 | Hsu | ................. | 52/2.21 |
| 4,802,734 A * | 2/1989 | Walter | ................. | 359/443 |
| 5,570,544 A * | 11/1996 | Hale et al. | ................. | 52/2.18 |
| 6,565,405 B2 * | 5/2003 | Hsu et al. | ................. | 446/89 |
| 6,679,007 B1 * | 1/2004 | Minchew et al. | ................. | 52/2.11 |
| 6,722,084 B2 * | 4/2004 | Berman | ................. | 52/2.11 |
| 6,875,119 B2 * | 4/2005 | Murphy et al. | ................. | 472/134 |
| 7,878,877 B2 * | 2/2011 | Scherba | ................. | 446/220 |
| 2003/0116182 A1 * | 6/2003 | Ueda et al. | ................. | 135/124 |
| 2007/0123141 A1 * | 5/2007 | Berkey et al. | ................. | 446/220 |
| 2009/0249701 A1 * | 10/2009 | Turcot | ................. | 52/2.18 |

* cited by examiner

*Primary Examiner* — Kurt Fernstrom
(74) *Attorney, Agent, or Firm* — James E. Hudson, III; Crain, Caton & James, P.C.

(57) ABSTRACT

An educational tool for teaching students may include a tarp portion, an inflatable being positioned on the tarp portion, the inflatable portion including a first end section positioned on a first end of the inflatable portion, a river section connected to the first end section, a middle section connected to the river section, and a second end section connected to the middle section. The river section may include a top river section and a bottom river section, and the top river section may be independently inflatable with respect to the bottom river section. The first end section may include a first contour portion, and the middle section may include a second contour portion. The second end section may include a third contour portion to cooperate with the second contour portion, and the second end section may include a fourth contour portion. The river portion may include a pullout portion, and the educational tool may include a tunnel baffle adapted to allow users to walk in a passageway of the tunnel baffle. The tunnel baffle may cooperate with the middle and second end section in order to form a classroom.

18 Claims, 6 Drawing Sheets

BIG CANYON BALLOON

CROSS-REFERENCE TO RELATED APPLICATIONS

The present invention claims priority under 35 USC section 119 based upon a provisional application which was filed on Jun. 23, 2008 with a serial number of 61/074,970.

STATEMENT REGARDING FEDERALLY SPONSORED RESEARCH OR DEVELOPMENT

Not applicable.

FIELD OF THE INVENTION

The present invention relates to educational tools and more particularly to an educational tool that provides education relating to the changes to the Earth over time.

BACKGROUND OF THE INVENTION

Balloons have been used as a source of entertainment for a number of years. Children as well as adults have been attracted to the presence of balloons.

Furthermore, balloons have been used as a source of locomotion and to provide the users of the balloons with an advantage of extending the viewing range of the users of the balloons due to the height that the balloons may be raised to. Balloons typically are lightweight and consequently can be assembled and disassembled and moved from one site to another fairly quickly and easily as result of the lightweight nature of the balloons. The balloons are generally formed from a flexible yet strong material and the balloon material may be expandable in response to fluid pressure applied generally to the interior surface of the balloon. In most cases, pressurized air is used to expand the balloon.

State-mandated testing is an important part of today's teaching curriculum in both public and private schools. A significant part of the teaching day is directed to helping the students master the state objectives at various grade levels in order to perform adequately for this state-mandated testing. A difficult topic to teach today's students involves how the Earth was formed and how the Earth is changing over time. One factor which contributes to making this a difficult topic is the lack of models or real-life examples of this change.

BRIEF SUMMARY OF THE INVENTION

An educational tool for teaching students may include a tarp portion, an inflatable being positioned on the tarp portion, the inflatable portion including a first end section positioned on a first end of the inflatable portion, a river section connected to the first end section, a middle section connected to the river section, and a second end section connected to the middle section.

The river section may include a top river section and a bottom river section, and the top river section may be independently inflatable with respect to the bottom river section.

The first end section may include a first contour portion, and the middle section may include a second contour portion.

The second end section may include a third contour portion to cooperate with the second contour portion, and the second end section may include a fourth contour portion.

The river portion may include a pullout portion, and the educational tool may include a tunnel baffle adapted to allow users to walk in a passageway of the tunnel baffle.

The tunnel baffle may cooperate with the middle and second end section in order to form a classroom.

BRIEF DESCRIPTION OF THE SEVERAL VIEWS OF THE DRAWINGS

The invention may be understood by reference to the following description taken in conjunction with the accompanying drawings, in which, like reference numerals identify like elements, and in which.

DETAILED DESCRIPTION OF THE INVENTION

The present invention includes an educational tool 100 which may be referred to as a Big Canyon Balloon. The educational tool 100 may be sufficiently large in order to provide the feeling of a real Canyon. The educational tool 100 is relatively lightweight and may be inflated by an electric or gas powered blowers. The lightweight nature of the educational tool 100 allows the educational tool 100 to be transported easily from one site to another and can be easily transported to different schools. Furthermore, the present invention provides an educational tool 100 which is easy to understand and provides a visual learning lesson to students and adults about the changes of the Earth over time. Consequently, from this learning lesson, the students can master the state mandates and this learning lesson supplements the book learning and teacher instructions. The educational tool 100 may be a cold air, inflatable balloon which may be of various sizes and may be 40×15×15' in order to provide a sense of the large-scale actual canyons which the educational tool 100 may be used to represent. The educational tool 100 may include a flexible material which may include a denier nylon, vinyl coated nylon as well as PVC which may be inflated with a blower system in order to allow the educational tool 100 to be expanded and then to be deflated in order that the educational tool can be easily moved from location to location.

The educational tool 100 may include indicia which may be printed on the outer surface of the educational tool 100, and the indicia may be striations and erosion lines to provide an educational experience through the natural look. These striations and erosion lines may be used to reflect the various sediment layers which may be found in the Canyon. The outer surface of the educational tool 100 may include contour and erosion lines in order to add to the natural appearance of the educational tool 100. The educational tool 100 may include an inflatable portion 103 which may be inflatable in order to provide a significant height dimension to the educational tool 100 and provide instruction as to the geological formations found in canyon walls. Furthermore, the educational tool 100 may include a tarp portion 105 which may be substantively a two-dimensional tarp which may include indicia that may be found on the canyon floor such as sediment as well as a shoreline.

Figure 1:
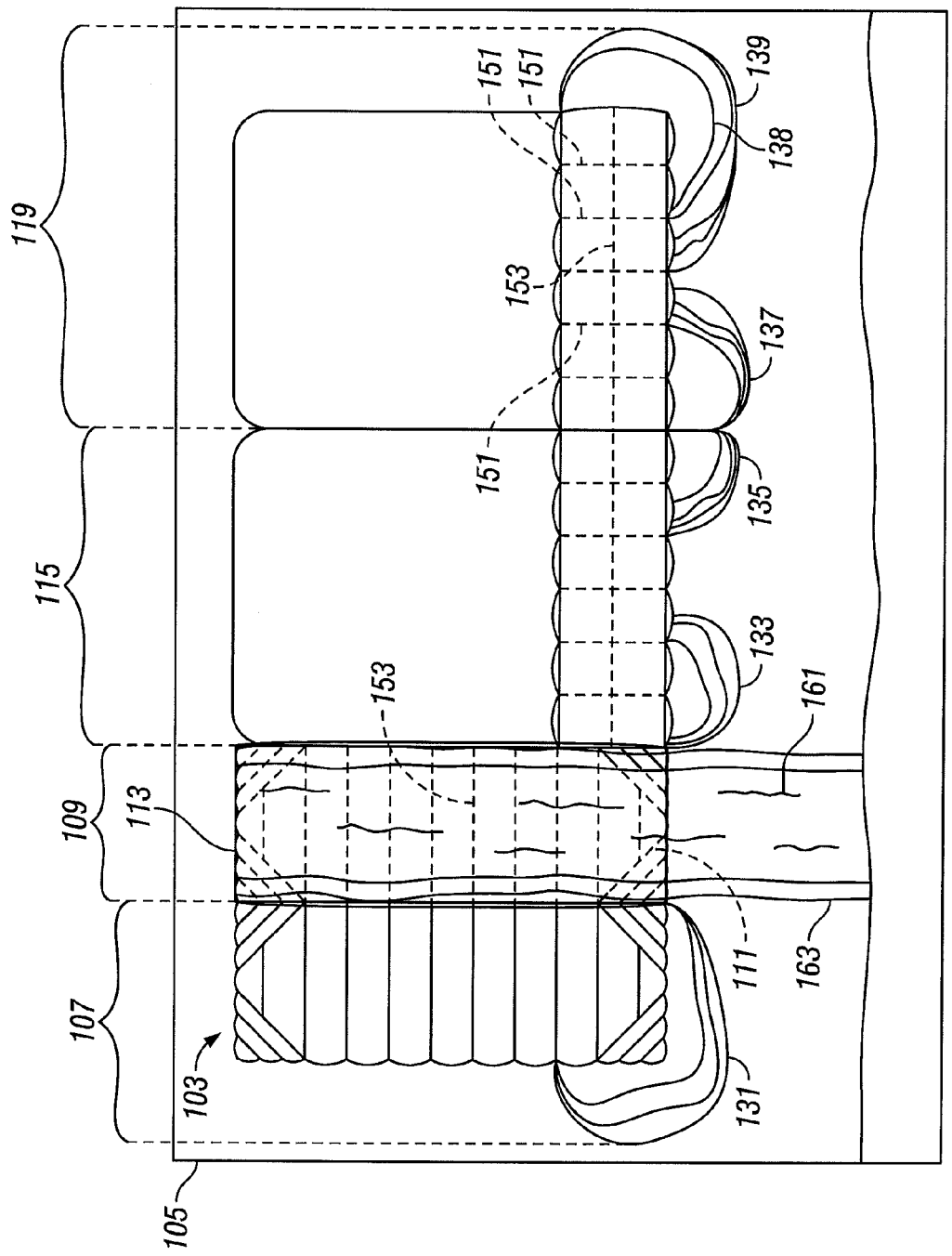
FIG. 1 illustrates a top view of the inflatable portion of the educational tool of the present invention.

FIG. 1 illustrates a top view of the educational tool 100 of the present invention. The educational tool 100 may include a first end section 107 which may be positioned at an end of the educational tool 100 and may be substantially rectangular in cross-section and a river section 109 which may be adjacent to the first end section 107 and substantially rectangular in cross-section and maybe decorated as a river cascading down the educational tool 100. The river section 109 may include a bottom section 111 and a top section 113 which may be inflated and deflated independently of the bottom section 111 to indicate a river eroding the riverbed as time progresses. The top section 111 may include a valve to deflate the top section 113.

FIG. 1 additionally illustrates that the educational tool 100 may include a middle section 115 which may be positioned adjacent to the river section 109 and may be substantially rectangular in shape and may include a second end section 119 which may be formed in adjacent to the middle section 115 and opposes the first end section 107. The number of sections may be increased or decreased in accordance with the needs of the invention.

FIG. 1 additionally illustrates that the educational tool 100 may include contour portions which correspond to contours of a canyon. FIG. 1 illustrates a first contour portion 131 which may extend around the outermost corner of the first end second 107 and may extend the substantial height of the first end section 107 or may only extend a portion of the height of the first end section 107.

FIG. 1 additionally illustrates a second contour portion 133 and a third contour portion 135 which may extend out from the middle section 115 and may extend substantially the entire height or a portion of the height of the middle section 115. FIG. 1 illustrates a fourth contour portion 137 which may cooperate with the third contour portion 135 or may be independent from the third contour portion 135 and a fifth contour portion 139 which extends around the outer corner of the second end portion 119. The contour portions 131, 133, 135, 137 and 139 represent contours of the actual Canyon and may include erosion lines 138 and striated layers.

FIG. 1 additionally illustrates that the middle section 115 and the second end section 119 may include a longitudinal baffle 153 and traverse baffle 151 to provide structure to the educational tool 100. The longitudinal baffle 153 and the traverse baffle 151 may be formed to allow communication of the air/fluid supporting the educational tool 100.

FIG. 1 additionally illustrates a tarp portion 105 which extends generally under the inflatable portion 103 and may include indicia 161 which cooperates with the river section 109 and may be color-coordinated with the rivers section 109. FIG. 1 additionally illustrates a pull out section 163 which slides out to show additional education material such as sediment examples.

Figure 2:
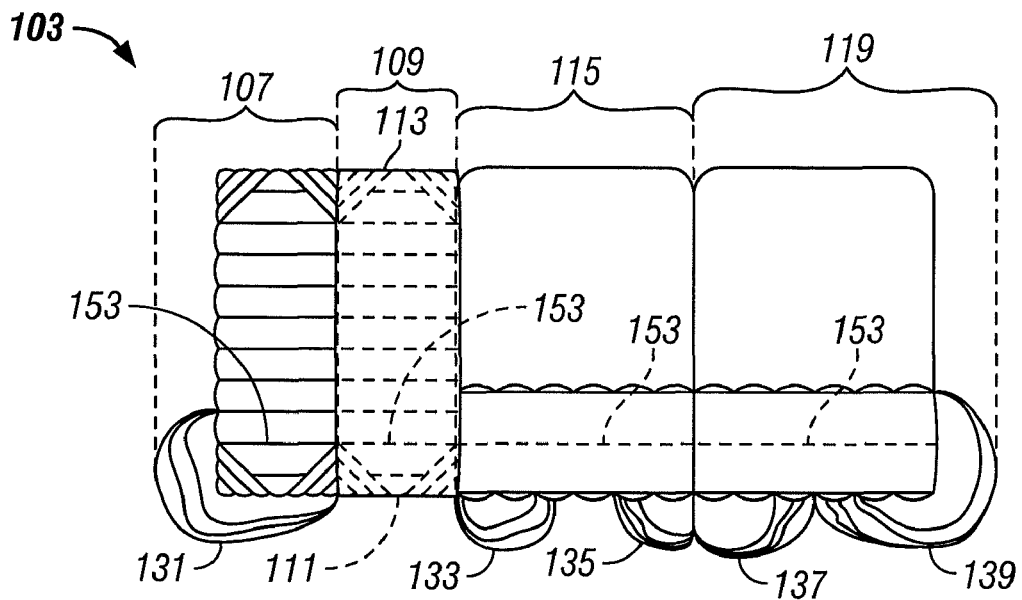
FIG. 2 illustrates a top view of the inflatable portion of the educational tool of the present invention.

FIG. 2 illustrates a top view of the educational tool 100 of the present invention. The educational tool 100 may include a first end section 107 which may be positioned at an end of the educational tool 100 and may be substantially rectangular in cross-section and a river section 109 which may be adjacent to the first end section 107 and substantially rectangular in cross-section and maybe decorated as a river cascading down the educational tool 100. The river section 109 may include a bottom section 111 and a top section 113 which may be inflated and deflated independently of the bottom section 111 to indicate a river eroding the riverbed as time progresses.

FIG. 2 additionally illustrates that the educational tool 100 may include a middle section 115 which may be adjacent to the river section 109 and may be substantially rectangular in shape and may include a second end section 119 which may be formed in adjacent to the middle section 115 and opposes the first end section 107.

FIG. 2 additionally illustrates that the educational tool 100 may include contour portions which correspond to contours of a canyon. FIG. 2 illustrates a first contour portion 131 which may extend around the outermost corner of the first end second 107 and may extend the substantial height of the first end section 107 or may only extend a portion of the height of the first end section 107.

FIG. 2 additionally illustrates a second contour portion 133 and a third contour portion 135 which may extend out from the middle section 115 and may extend substantially the entire height or a portion of the height of the middle section 115. FIG. 2 illustrates a fourth contour portion 137 which cooperates with the third contour portion 135 and a fifth contour portion 139 which extends around the outer corner of the second end portion 119.

Figure 3:
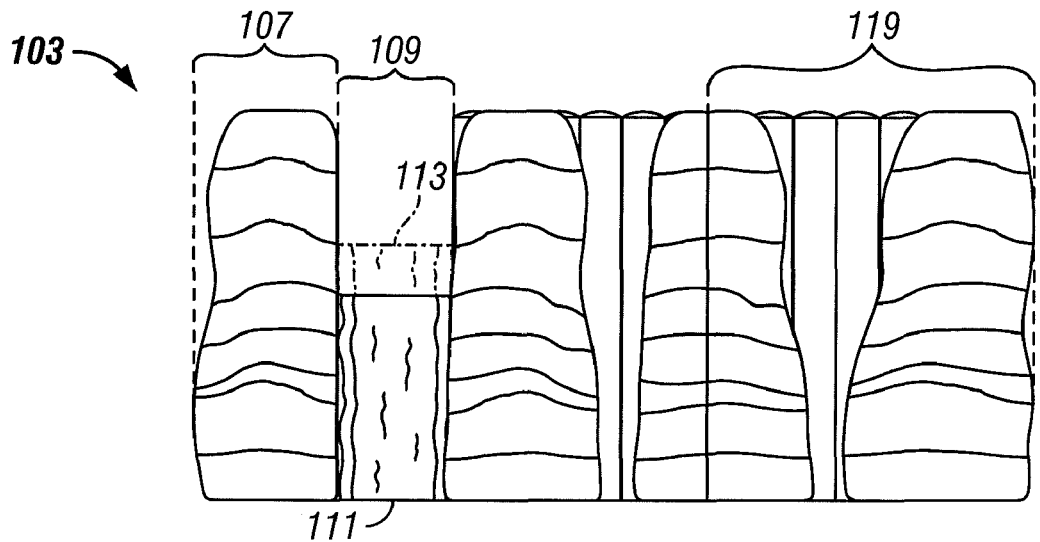
FIG. 3 illustrates a front view of the inflatable portion of the educational tool of the present invention.

FIG. 3 illustrates a front view of the educational tool 100 of the present invention. FIG. 3 illustrates the original position of the top portion 113 in Phantom line and the lowered position of the top portion 113 after the top portion 113 has been deflated in order to show the erosion of the riverbed.

FIG. 3 additionally illustrates the first end section 107, the middle section 115 and the second end section 119.

Figure 4:
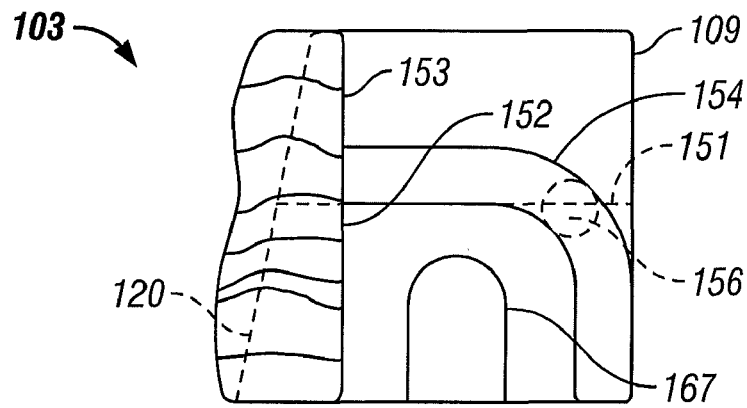
FIG. 4 illustrates a cross-sectional view of the end of the inflatable portion of the educational tool of the present invention.

FIG. 4 illustrates a side view of the educational tool 100 of the present invention. FIG. 4 may illustrate a side view of the middle section 115 or the second end section 119 and illustrates the outer surface 120 which may be the front surface and may be inclined in order to add to the realism of the canyon. FIG. 4 illustrates the traverse baffle 151 and the longitudinal baffle 153 which may extend from top to bottom of the middle section 115 or the second end section 119.

FIG. 4 additionally illustrates a tunnel baffle 154 which may be sufficiently rigid so that children may traverse through the tunnel baffle 154. The tunnel baffle 154 may have a substantially circular cross-section and may extend between the bottom of the middle section 115 or the second end section 119 to the longitudinal baffle 153. The tunnel baffle 154 may be connected to adjacent tunnel baffle 154 by an interconnecting baffle 156 which may be substantially perpendicular to the tunnel baffle 154. The bottom portion of the longitudinal baffle 153 may include a wall section 152 which cooperates with the outer surface of the tunnel baffle 154 to form housing for a classroom. The users of the classroom enter the classroom through a door 167 formed in the outer surface of the second end section 119. The wall section 152 may include indicia which may correspond to oil deposits and fossils which may be found within the canyon.

Figure 5:
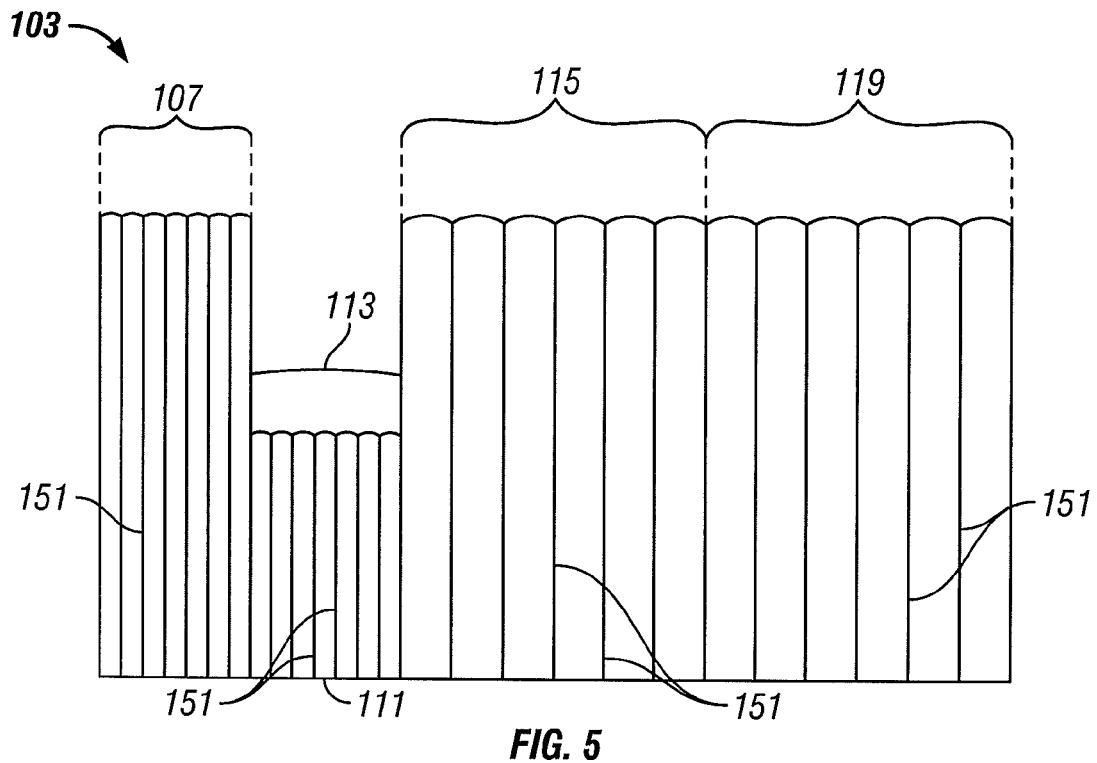
FIG. 5 illustrates a cross-sectional view of the front of the inflatable portion of the educational tool of the present invention.

FIG. 5 illustrates a front cross-sectional view of the educational tool 100 and illustrates traverse baffles 151 being in a spaced relationship and being formed in the first end section 107, the bottom river section 113 of the river section 109, the middle section 115 and the second end section 119. The traverse baffles 151 may be spaced at a first predetermined distance with respect to the middle section 115 and the second end section 119. The traverse baffles 151 may be spaced at a second predetermined distance with respect to the first end section 109 and the bottom river section 113 and the second predetermined distance may be less than as shown in FIG. 5, equal to or greater than the first predetermined distance.

Figure 6:
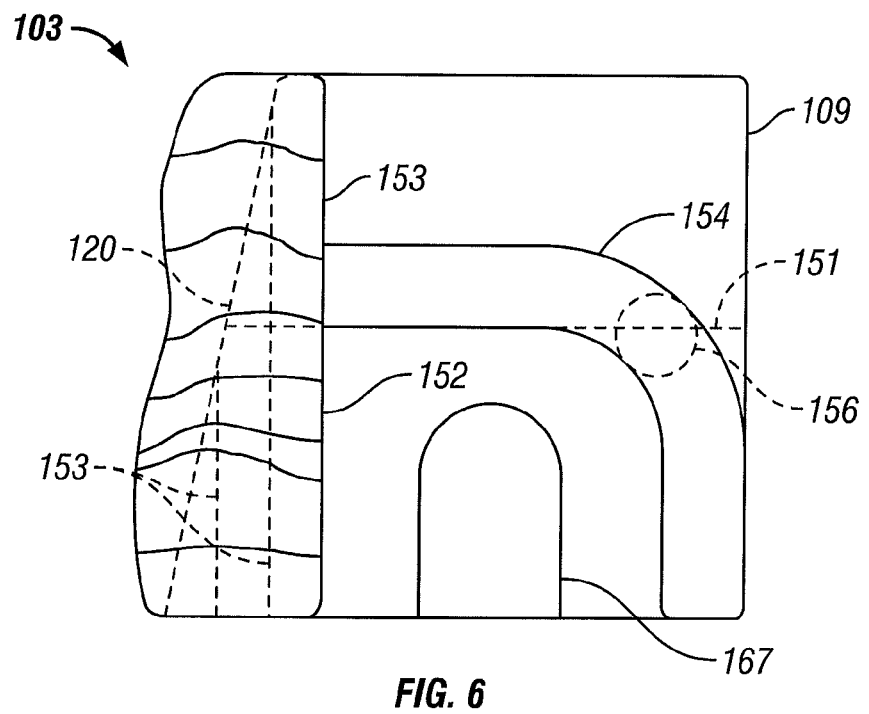
FIG. 6 illustrates a cross-sectional view of the side of the inflatable portion of the educational tool of the present invention.

FIG. 6 illustrates a side view of the educational tool 100 of the present invention. FIG. 6 may illustrate a side view of the middle section 115 or the second end section 119 and illustrates the outer surface 120 which may be the front surface and may be inclined in order to add to the realism of the canyon. FIG. 6 illustrates the traverse baffle 151 and the longitudinal baffle 153 which may extend from top to bottom of the middle section 115 or the second end section 119. FIG. 6 additionally illustrates a tunnel baffle 154 which may be sufficiently rigid so that children may traverse through the tunnel baffle 154. The tunnel baffle 154 may have a substantially circular cross-section and may extend between the bottom of the middle section 115 or the second end section 119 to the longitudinal baffle 153. The tunnel baffle 154 may be connected to adjacent tunnel baffle 154 by an interconnecting baffle 156 which may be substantially perpendicular to the tunnel baffle 154. The bottom portion of the longitudinal baffle 153 may include a wall section 152 which cooperates with the outer surface of the tunnel baffle 154 to form housing for a classroom. The users of the classroom enter the classroom through a door 167 formed in the outer surface of the second end section 119. The wall section 152 may include indicia which may correspond to oil deposits and fossils which may be found within the canyon.

FIG. 6 additionally illustrates longitudinal baffles 153 which may be of varying heights in order to accommodate the outer surface 120 which may be inclined.

Figure 7:
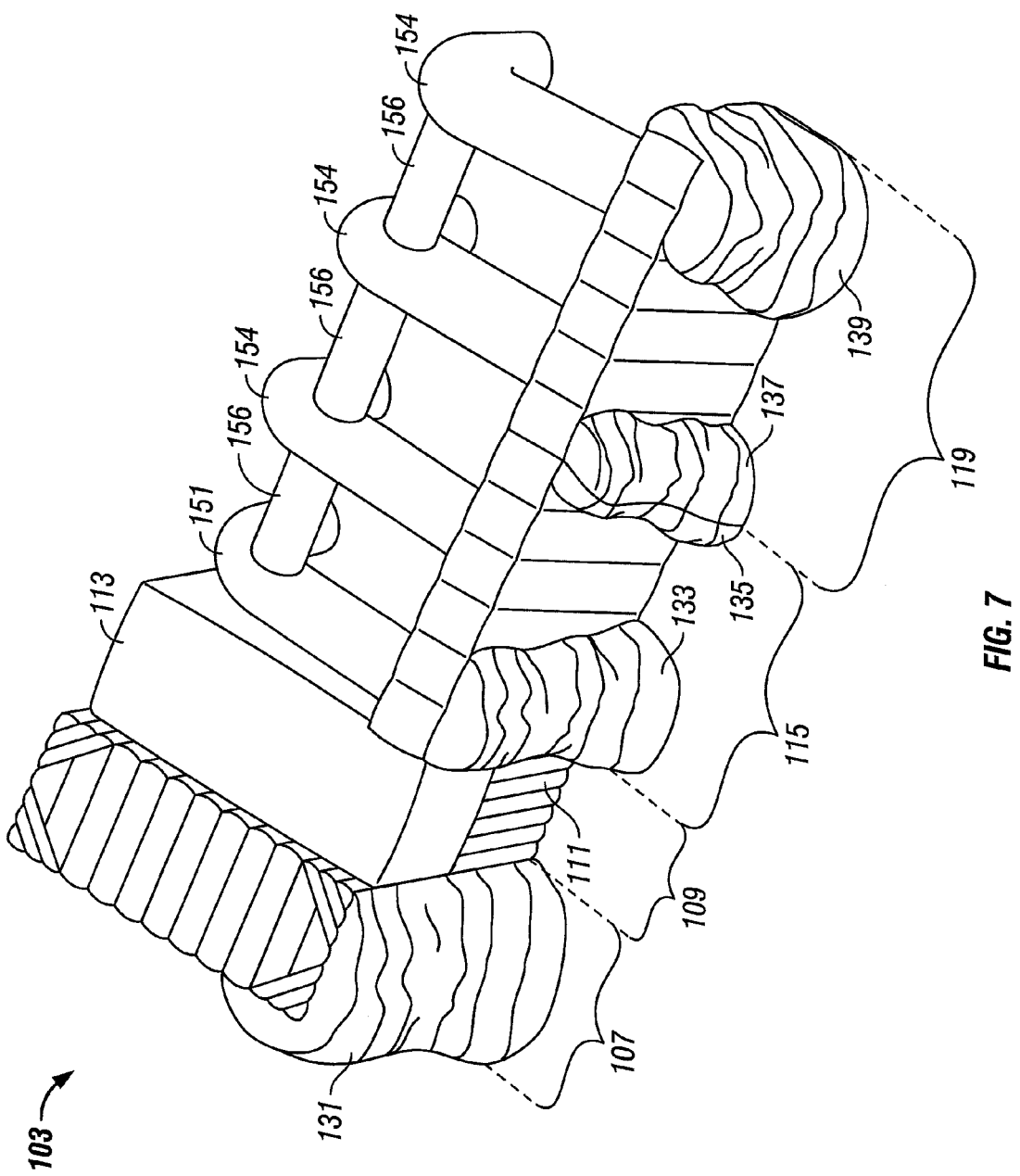
FIG. 7 illustrates a perspective sectional view of the inflatable portion of the educational tool of the present invention.

FIG. 7 illustrates a perspective view of the educational tool 100 of the present invention. The educational tool 100 may include a first end section 107 which may be positioned at an end of the educational tool 100 and a river section 109 which may be adjacent to the first end section 107 and may be decorated as a river cascading down the educational tool 100. The river section 109 may include a bottom section 111 and a top section 113 which may be inflated and deflated independently of the bottom section 111 to indicate a river eroding the riverbed as time progresses. FIG. 7 shows the top section 113 as being deflated.

FIG. 7 additionally illustrates that the educational tool 100 may include a middle section 115 which may be adjacent to the river section 109 and may include a second end section 119 which may be formed in adjacent to the middle section 115 and opposes the first end section 107.

FIG. 7 additionally illustrates that the educational tool 100 may include contour portions which correspond to contours of a canyon. FIG. 7 illustrates a first contour portion 131 which may extend around the outermost corner of the first end second 107 and may extend the substantial height of the first end section 107 or may only extend a portion of the height of the first end section 107.

FIG. 7 additionally illustrates a second contour portion 133 and a third contour portion 135 which may extend out from the middle section 115 and may extend substantially the entire height or a portion of the height of the middle section 115. FIG. 2 illustrates a fourth contour portion 137 which cooperates with the third contour portion 135 and a fifth contour portion 139 which extends around the outer corner of the second end portion 119.

FIG. 7 additionally illustrates a tunnel baffle 154 which may be sufficiently rigid so that children may traverse through the tunnel baffle 154. The tunnel baffle 154 may have a substantially circular cross-section and may extend between the bottom of the middle section 115 or the second end section 119 to the longitudinal baffle 153. The tunnel baffle 154 may be connected to adjacent tunnel baffle 154 by an interconnecting baffle 156 which may be substantially perpendicular to the tunnel baffle 154.

FIG. 7 illustrates the tunnel baffles 154 being associated with the middle section 115 and the second end section 119. However, fewer or more tunnel baffles 154 may be extended to other sections 107, 109 or may be limited to just one section 107, 109, 115, 119.

Figure 8:
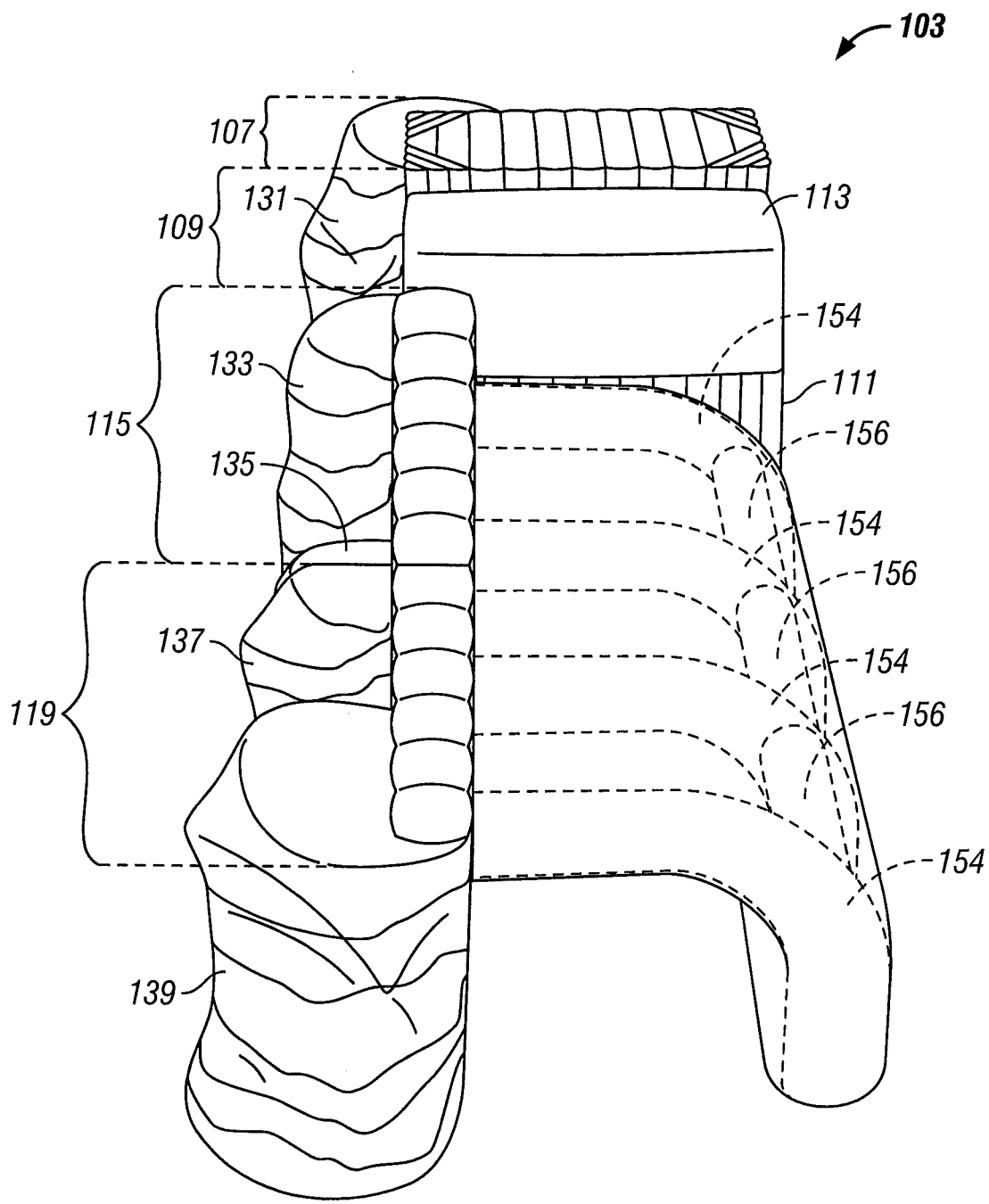
FIG. 8 illustrates a perspective view of the inflatable portion of the educational tool of the present invention.

FIG. 8 illustrates another perspective view of the educational tool 100 of the present invention. FIG. 8 illustrates the first end section 107, the river section 109, the middle section 115 and the second end section 119. The river section 109 may include a bottom section 111 and a top section 113 which may be inflated and deflated independently of the bottom section 111 to indicate a river eroding the riverbed as time progresses. FIG. 7 shows the top section 113 as being inflated.

FIG. 8 additionally illustrates that the educational tool 100 may include a middle section 115 which may be adjacent to the river section 109 and may include a second end section 119 which may be formed in adjacent to the middle section 115 and opposes the first end section 107.

FIG. 8 additionally illustrates that the educational tool 100 may include contour portions which correspond to contours of a canyon. FIG. 8 illustrates a first contour portion 131 which may extend around the outermost corner of the first end second 107 and may extend the substantial height of the first end section 107 or may only extend a portion of the height of the first end section 107.

FIG. 8 additionally illustrates a second contour portion 133 and a third contour portion 135 which may extend out from the middle section 115 and may extend substantially the entire height or a portion of the height of the middle section 115. FIG. 8 illustrates a fourth contour portion 137 which cooperates with the third contour portion 135 and a fifth contour portion 139 which extends around the outer corner of the second end portion 119.

FIG. 8 additionally illustrates a tunnel baffle 154 which may be sufficiently rigid so that children may traverse through the tunnel baffle 154. The tunnel baffle 154 may have a substantially circular cross-section and may extend between the bottom of the middle section 115 or the second end section 119 to the longitudinal baffle 153. The tunnel baffle 154 may be connected to adjacent tunnel baffle 154 by an interconnecting baffle 156 which may be substantially perpendicular to the tunnel baffle 154.

FIG. 8 illustrates the tunnel baffles 154 being associated with the middle section 115 and the second end section 119. However, fewer or more tunnel baffles 154 may be extended to other sections 107, 109 or may be limited to just one section 107, 109, 115, 119.

FIG. 8 illustrates that the tunnel baffles 154 and the interconnecting baffles 156 may be covered with the material such as fabric in order to provide a covered classroom in which students can be taught lessons about canyons such as oil deposits and fossils.

FIG. 8 illustrates another perspective view of the educational tool 100 of the present invention. FIG. 8 illustrates the first end section 107, the river section 109, the middle section 115 and the second end section 119. The river section 109 may include a bottom section 111 and a top section 113 which may be inflated and deflated independently of the bottom section 111 to indicate a river eroding the riverbed as time progresses. FIG. 7 shows the top section 113 as being inflated.

Figure 9:
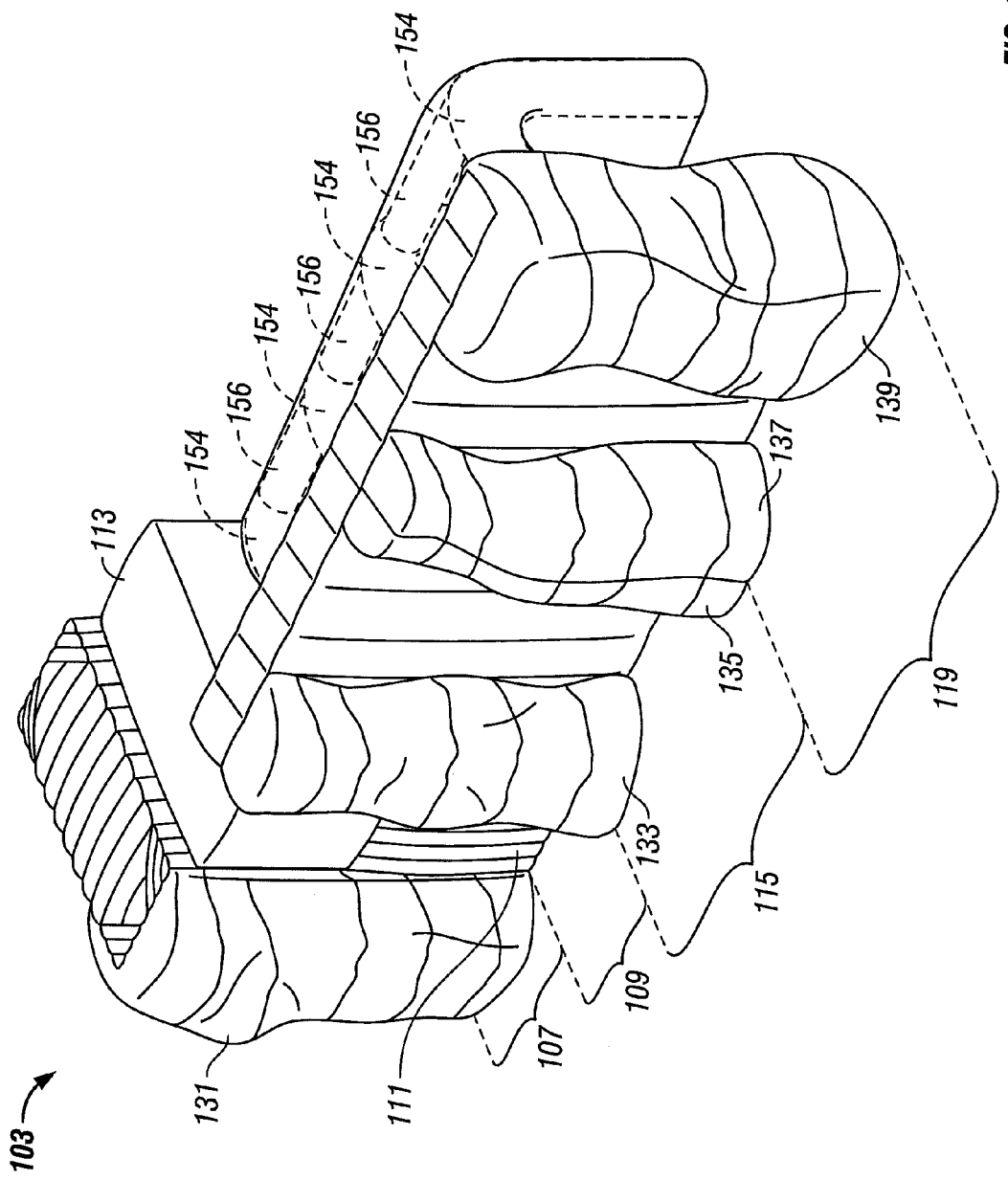
FIG. 9 illustrates another perspective view of the inflatable portion of the educational tool of the present invention.

FIG. 9 additionally illustrates that the educational tool 100 may include a middle section 115 which may be adjacent to the river section 109 and may include a second end section 119 which may be formed in adjacent to the middle section 115 and opposes the first end section 107.

FIG. 9 additionally illustrates that the educational tool 100 may include contour portions which correspond to contours of a canyon. FIG. 9 illustrates a first contour portion 131 which may extend around the outermost corner of the first end second 107 and may extend the substantial height of the first end section 107 or may only extend a portion of the height of the first end section 107.

FIG. 9 additionally illustrates a second contour portion 133 and a third contour portion 135 which may extend out from the middle section 115 and may extend substantially the entire height or a portion of the height of the middle section 115. FIG. 8 illustrates a fourth contour portion 137 which cooperates with the third contour portion 135 and a fifth contour portion 139 which extends around the outer corner of the second end portion 119.

FIG. 9 additionally illustrates a tunnel baffle 154 which may be sufficiently rigid so that children may traverse through the tunnel baffle 154. The tunnel baffle 154 may have a substantially circular cross-section and may extend between the bottom of the middle section 115 or the second end section 119 to the longitudinal baffle 153. The tunnel baffle 154 may be connected to adjacent tunnel baffle 154 by an interconnecting baffle 156 which may be substantially perpendicular to the tunnel baffle 154.

FIG. 9 illustrates the tunnel baffles 154 being associated with the middle section 115 and the second end section 117. However, fewer or more tunnel baffles 154 may be extended to other sections 107, 109 or may be limited to just one section 107, 109, 115, 119.

FIG. 9 illustrates that the tunnel baffles 154 and the interconnecting baffles 156 may be covered with the material such as fabric in order to provide a covered classroom in which students can be taught lessons about canyons such as oil deposits and fossils.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

I claim:

1. An educational tool for teaching students, comprising:
a tarp portion;
an inflatable portion being positioned on the tarp portion;
the inflatable portion including a first end section positioned on a first end of the inflatable portion;
a river section connected to the first end section;
a middle section connected to the river section;
a second end section connected to the middle section; and
wherein the river section is decorated as a river cascading down and includes a top river section and a bottom river section, and wherein the top river section is independently inflatable and deflatable with respect to the bottom river section to indicate a river eroding a riverbed.

2. An educational tool for teaching students as in claim 1, wherein the first end section includes a first contour portion.

3. An educational tool for teaching students as in claim 1, wherein the middle section includes a second contour portion.

4. An educational tool for teaching students as in claim 3, wherein the second end section includes a third contour portion to cooperate with the second contour portion.

5. An educational tool for teaching students as in claim 1, wherein the second end section includes a fourth contour portion.

6. An educational tool for teaching students as in claim 1, wherein the river section includes a pullout portion showing sediment examples, the pullout portion slideably extending from the bottom of the bottom river section atop the tarp portion.

7. An educational tool for teaching students as in claim 1, wherein the educational tool includes a tunnel baffle adapted to allow users to walk in a passageway of the tunnel baffle.

8. An educational tool for teaching students as in claim 7, wherein the tunnel baffle cooperates with the middle and second end section in order to form a classroom.

9. An educational tool for teaching students comprising:
an inflatable first end section; and
an inflatable river section decorated as a river cascading down adjacent the inflatable first end section, the river section having an inflatable top river section and an inflatable bottom river section, the top river section deflatable independent of the inflatable bottom river section to indicate a river eroding a riverbed.

10. The educational tool of claim 9, wherein the top river section further comprises a deflation valve.

11. The educational tool of claim 9, further comprising an inflatable second end section.

12. The educational tool of claim 11, wherein the first end section includes a first contour portion.

13. An educational tool for teaching students as in claim 12, further comprising wherein a middle section, the middle section includes a second contour portion.

14. An educational tool for teaching students as in claim 13, wherein the second end section includes a third contour portion to cooperate with the second contour portion.

15. An educational tool for teaching students as in claim 14, wherein the second end section includes a fourth contour portion.

16. An educational tool for teaching students as in claim 15, wherein the river section includes a pullout portion showing sediment examples, the pullout portion slideably extending from the bottom of the bottom river section atop a tarp portion.

17. An educational tool for teaching students as in claim 16, wherein the educational tool includes a tunnel baffle adapted to allow users to walk in a passageway of the tunnel baffle.

18. An educational tool for teaching students as in claim 17, wherein the tunnel baffle cooperates with the middle and second end section in order to form a classroom.

* * * * *